W. HENRY.
Vehicle-Spring.

No. 224,906. Patented Feb. 24, 1880.

Witnesses
Otto Hufeland
William Miller

Inventor
William Henry.
by
Van Santvoord & Hauff
his attorneys

UNITED STATES PATENT OFFICE.

WILLIAM HENRY, OF NEW YORK, N. Y.

VEHICLE-SPRING.

SPECIFICATION forming part of Letters Patent No. 224,906, dated February 24, 1880.

Application filed December 5, 1879.

*To all whom it may concern:*

Be it known that I, WILLIAM HENRY, of the city, county, and State of New York, have invented a new and useful Improvement in Springs for Vehicles, which invention is fully set forth in the following specification, reference being had to the accompanying drawings, in which—

Figure 1:
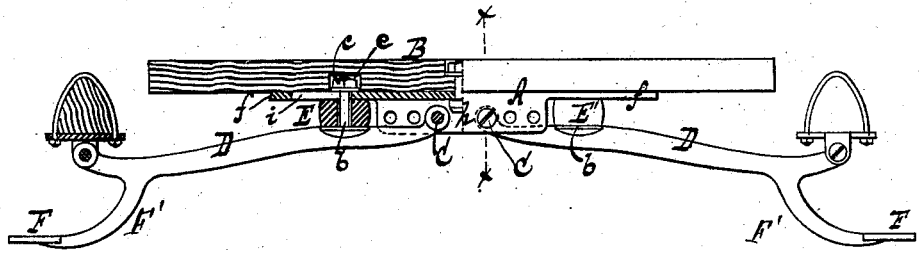
Figure 2:
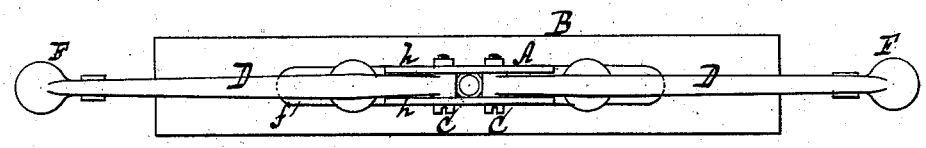
Figure 3:
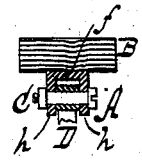

Figure 1 shows my spring, partly in side view and partly in section. Fig. 2 is an inverted plan view thereof. Fig. 3 is a cross-section of the same, the plane of section being indicated by the line $x\ x$, Fig. 1.

Similar letters indicate corresponding parts.

My invention relates especially to that class of springs for which Letters Patent of the United States were granted to me July 1, 1879, No. 217,105; and it consists in certain novel combinations of parts hereinafter fully described, and pointed out in the claims.

In the drawings, the letter A designates a bracket, which is firmly attached to a bar, B, forming a part of the platform or other part of a vehicle, according to the location of the spring, and C C are two pivots, which have their bearings in the bracket, and on which are mounted levers D D. The inner ends of the levers D D are the points at which they are mounted on the pivots C C, their outer ends being connected to the side bars or any other suitable part of a vehicle.

Between the ends of the levers D D are bolts $b\ b$, (see Fig. 1,) whereby they are connected to the bracket A, and on these bolts are arranged cushions E E, of india-rubber or other elastic material, in such a manner that these cushions are interposed between the levers and the bracket, and when the latter is depressed, as by a weight put on the bar B, the cushions are compressed.

By mounting the two levers D D on the independent pivots C C they can be made to coincide with each other without reducing the width thereof at their pivotal points, as when they are both mounted on one and the same pivot, which obviously increases the strength and durability of the levers, while at the same time the pivots are subjected to the least amount of strain.

The bolts $b$ are rigidly attached to the levers D D at one end, and thence pass up through the bracket A, while they are respectively tightened by a nut, $c$, which is fitted thereon at the upper end and bears on the top of the bracket.

In the bar or platform B are recesses, one of which is shown at $e$, Fig. 1, to receive the nuts of the bolts $b$, and by this arrangement the bracket A is permitted to lie close up to the bar or platform, while the nuts, moreover, are inclosed, so that they are not liable to get lost.

The bracket A consists of a plate, $f$, which is attached to the bar or platform B, and has two longitudinal slots, one of which is shown at $i$, Fig. 1, through which pass the bolts $b$, and, further, of side cheeks, $h\ h$. These cheeks are the parts forming the bearings for the pivots C C, and they are elongated, as shown, to allow these pivots to be set toward or from each other, as may be required.

In applying my spring to use, the levers D D are first set to the proper position relatively to the side bars or other part of the vehicle, and then holes are drilled at the required points in the cheeks $h\ h$ for the reception of the pivots C C. As the levers D D are moved in or outward the bolts $b$ slide in the slots $i$, carrying with them the cushions E E, so that the bolts adjust themselves to the levers, and when the latter have been set the recesses $e$ are formed in the appropriate parts of the bar or platform B, when the bracket A is secured in place.

The levers D D are each provided with a step, F, attached to the outer extremity of a curved bar, F'. These step-supporting bars are formed integral with the levers D, and are arranged at a point thereon in proximity to the connection of the levers with the side bars, and said step-supporting bars extend out from the levers in the same plane with the latter, and project beyond or outside of the side bars in such manner that a line drawn longitudinally through the centers of the levers will intersect the longitudinal centers of the step-supporting bars. By such arrangement of the step all lateral twisting strain on the levers is avoided in stepping into the vehicle, which serious objection is present where the step-supporting bar projects laterally from the levers, as heretofore constructed. Furthermore, by my particular arrangement of the step-supporting bar, when any weight is brought to bear on the step, such weight is supported wholly by the rigid side bar, and the pressure is exerted on the lever in a direct longitudinal line from end to end of the same; and, further, the connection between the side bar and lever acts as a fulcrum, causing the inner end of the lever to have a tendency to move upward and elevate the body of the vehicle at the center thereof, whereby any liability of the body tilting to one side is effectually avoided.

What I claim as new, and desire to secure by Letters Patent, is—

1. In a spring-vehicle, the combination of a bracket, two independent pivots, both having their bearings in said bracket, two levers arranged on said pivots at their inner ends, two bolts respectively attached to and projecting upward from the levers and connected with the bracket, and elastic cushions encircling said bolts between the bracket and cushions, substantially as shown and described.

2. In a spring-vehicle, the combination of the bar or platform B, having recesses in its under side, a bracket attached to the under side thereof and having two independent pivots, two levers arranged on said pivots at their inner ends, and two bolts provided with encircling cushions and respectively attached to and projecting from the levers and having their ends passing through the brackets, and provided with retaining-nuts, which are fitted into the recesses in the bar or platform, substantially as described.

3. In spring-vehicles, a bracket having longitudinal side cheeks, $h$, and an elongated slot, $i$, at each end, and two independent pivots having their bearings in the side cheeks, in combination with two levers arranged on said pivots at their inner ends and two bolts provided with encircling cushions, and respectively attached to the levers and extending upwardly through and longitudinally adjustable in the elongated slots $i$ of the bracket, being confined by retaining-nuts, substantially as described, for the purpose set forth.

4. The lever D, having a pivotal attachment at its outer end with the side bar of a vehicle, and provided with a step-supporting bar formed integral with said lever, and extending downwardly and outwardly beyond or outside the side bar in the same vertical longitudinal plane of the lever, substantially as described, whereby pressure exerted on the step-supporting bar is sustained by the side bar and transmitted to the lever in a longitudinal direction, as set forth.

In testimony that I claim the foregoing I have hereunto set my hand and seal this 1st day of December, 1879.

WM. HENRY. [L. S.]

Witnesses:
W. HAUFF,
CHAS. WAHLERS.